United States Patent Office 2,999,117
Patented Sept. 5, 1961

2,999,117
ALKYL DECABORANES AND METHOD FOR THEIR MANUFACTURE
Elmar R. Altwicker, Dayton, and Alfred B. Garrett, Columbus, Ohio, and Earl A. Weilmuenster, Kenmore, N.Y., and Samuel W. Harris, Oxford, Ohio, assignors, by mesne assignments, to Olin Mathieson Chemical Corporation, a corporation of Virginia
No Drawing. Filed Mar. 28, 1955, Ser. No. 497,407
17 Claims. (Cl. 260—606.5)

Our invention relates to new chemical compositions which are alkylated decaboranes and to a method for their preparation. The compositions of our invention can be used as fuels.

It is known in the art to prepare decaborane. The material is a stable, white crystalline solid which melts at 99.5° C. and which boils at 213°C. Decaborane is a boron hydride of very high boron content and has a very high heat of combustion indicating its utility as a high energy fuel. Being a solid, however, decaborane is not conveniently handled and this detracts from its utility for fuel purposes.

In accordance with our present invention, we have discovered that decaborane and lower alkyl halides can be reacted in admixture with an alkylation catalyst to form alkylated decaboranes. The alkyl halides used contain from 1 to 5 carbon atoms, and the alkylated decaboranes produced by the reaction using the alkylation catalyst contain from 1 to 4 alkyl groups attached to each decaborane nucleus. The new products produced in accordance with the method of our invention are borohydrocarbons of relatively high boron content and at the same time they are liquids, so that they constitute a conveniently handled fuel of considerably greater energy content than the simple hydrocarbon fuels.

The following examples illustrate in detail the preparation of various compositions falling within the scope of our invention and are to be considered not limitative thereof.

*Example I*

2.189 grams of decaborane, 0.452 gram of aluminum chloride and 3 ml. of methyl iodide were placed in a 1000 ml. reaction flask, which was then sealed off under a vacuum. The reaction was run by placing the flask for twenty-four hours in an oven which was maintained at 100° C.

The reaction mixture was then worked up using a standard vacuum line set-up. The volatile hydrogen iodide produced as a result of the reaction and any remaining methyl iodide were removed by applying vacuum to the reaction flask and the hydrogen iodide produced was measured by titration. The hydrogen iodide required 138 ml. of 0.2007 normal sodium hydroxide for neutralization.

After the methyl iodide and hydrogen iodide had been taken overhead, unreacted decaborane and alkylated decaborane which was essentially dimethyldecaborane were dissolved in benzene, the aluminum chloride filtered off and the solvent (benzene) removed under vacuum (about 0.5 mm. of mercury absolute pressure) at room temperature. The remaining liquid was then distilled under vacuum (about 5.0 mm. of mercury absolute pressure) and at a still head temperature of about 81–85° C. to remove the decaborane which condensed on the walls of the still; the alkylated decaborane was collected as a distillate. The alkylated decaborane was a colorless volatile liquid having no measurable melting point, but freezing into a glass. It had the viscosity of a light oil, did not inflame in air, but reacted with air upon long standing. The product reacted with water only slowly at room temperatures. Chemical analysis of the alkylated decaborane was done by (1) hydrolysis and by (2) oxidation with nitric acid. Hydrolysis data indicate the amount of hydridic hydrogen and part of the boron present; nitric acid oxidation date give the total amount of carbon and boron present. The hydrolysis analysis showed that the sample of alkylated decaborane contained 8.43 percent hydridic hydrogen by weight (theoretical for dimethyldecaborane, 8.04 percent by weight) and the oxidation analysis showed that the alkylated decaborane contained 17.1 percent of carbon and 71.6 percent of boron by weight (theoretical for dimethyldecaborane, 16.0 percent and 72.0 percent by weight, respectively).

*Example II*

27 grams (0.42 mole) of ethyl chloride, 30.0 grams (0.24 mole) of decaborane crystals and 1.0 gram of aluminum chloride were charged to a 250 cc. autoclave which was cooled with solid carbon dioxide to prevent evaporation of the ethyl chloride. The bomb was allowed to warm to room temperature (approximately 30° C.), and after nineteen hours the hydrogen chloride formed by the reaction was bled off. The maximum observed pressure allowed to develop during the reaction was 50 p.s.i.g. The remaining products amounting to 39.0 grams of low volatile liquids and solids were removed from the bomb and filtered. The filtered liquid recovered amounted to 15.6 grams. This liquid was distilled in two separate batches as shown below:

|  | Sample A | Sample B |
| --- | --- | --- |
| Wt. of Charge, g | 2.8 | 12.8 |
| Distillate, g | 1.8 | 9.2 |
| Residue, g | 0.6 | 1.9 |
| Distillation Pressure, mm. of Hg | 2 | 2 |
| Head Temperature, ° C | 80–110 | 76–130 |
| Maximum Pot Temperature, ° C | 152 | 162 |

The total yield of distilled product was 11.0 grams and represented a yield of 30 percent, based upon the decaborane charged to the reactor. The infrared spectrophotometer and mass spectrum pattern showed that the distillates were monoethyldecaborane.

*Example III*

As in Example II, 28.0 grams of ethyl chloride, 30.0 grams of decaborane and 1.0 gram of aluminum chloride were charged to a cooled autoclave which was then permitted to warm to room temperature (approximately 30° C.) and remain there for 72 hours. The hydrogen chloride formed by the reaction was then bled off. The material remaining in the autoclave amounted to 34.5 grams of which 8.2 grams was solid. This material was then distilled at 1 mm. of mercury pressure and at a temperature of 75–105° C. During the distillation, 20.4 grams of liquid was recovered. The infrared spectrophotometer pattern of the liquid distillate showed ethylated decaboranes, and mass spectra patterns of the liquid showed monoethyldecaborane, diethyldecaborane and triethyldecaborane, the main product being the monoethyldecaborane. If desired, the three decaboranes can be separated from each other by further fractionation of the liquid distillate.

*Example IV*

In a 200 ml. one-necked flask, fitted with a water cooled condenser were placed 24 grams (0.2 mole) of crystalline decaborane, 2 grams (0.02 mole) of finely ground resublimed aluminum chloride, 50 ml. of methylcyclohexane and 24.6 grams (0.2 mole) of n-propyl bromide. The mixture was heated, without stirring, to an external temperature of 90° C. During this heating, a gas was evolved and the mixture became dark brown in color. Heating in this manner was continued for three hours, at which time the reaction mixture was cooled and the liquid was decanted from the small amount of solids.

The methylcyclohexane was removed from the liquid by distillation under reduced pressure, and the remaining liquid was distilled (boiling point 100° C. at an absolute pressure of 1.3 mm. of mercury). The apparatus used for the distillation consisted of a cold-finger drip condenser and a wide bore Liebig condenser in series. The outlet to the vacuum pump was connected at the end of the Liebig condenser. Cold water was passed through the Liebig condenser but not through the cold finger. The apparatus with the exception of the Liebig condenser was kept hot with a heating lamp. Since the unreacted decaborane distilled first, it passed through the hot region and collected on the walls of the wide bore Liebig condenser as a solid. When the decaborane had all been removed, liquid began dropping from the drip tip of the cold finger condenser. At this point, cold water was passed into the cold-finger drip condenser and the heat lamp was removed. From this point, the distillation proceeded in a typical manner to provide 4.0 grams of alkylated decaborane, the majority of which was shown to be isopropyldecaborane by means of its infrared and mass spectrum.

*Example V*

In a 500 ml. 3-necked flask fitted with a water cooled condenser, a mechanical stirrer and an addition funnel were placed 24 grams (0.2 mole) of crystalline decaborane, 2 grams (0.02 mole) of finely ground resublimed aluminum chloride and 100 ml. of methylcyclohexane. Stirring was started and the reaction mixture was heated to 85° C. At this time, 31 grams (0.25 mole) of isopropyl bromide was added dropwise at such a rate that 30 minutes was required for the addition. Heating and stirring was continued for seven hours. After cooling the reaction mixture, 5.0 grams of alkylated decaborane having a boiling point of 95° C. at an absolute pressure of 1 mm. of mercury was isolated by the procedure described in Example IV. Here again, the majority of the product was shown to be isopropyldecaborane by means of its infrared and mass spectrum.

*Example VI*

In a 200 ml. 1-necked flask fitted with a water-cooled condenser were placed 12 grams (0.1 mole) of crystalline decaborane and one gram (0.01 mole) of finely ground resublimed aluminum chloride. 59.2 grams (0.4 mole) of isopropyl bromide was then added to the flask and there was an immediate reaction with the evolution of a large amount of gas. At the end of one hour, the reaction had almost ceased and water in amount about equal in volume to the volume of the reaction mixture was added to quench any remaining reaction. The aqueous solution formed was extracted with three 50 ml. portions of ethyl ether and the ether solution thus formed was dried over magnesium sulfate. After filtering, in order to separate the magnesium sulfate, and removing the ethyl ether under reduced pressure, the remaining liquid was vacuum distilled to provide a distillate having a boiling point of 90° C. at an absolute pressure of 0.6 mm. of mercury. This liquid consisted largely of monoisopropyldecaborane, but its infrared spectrum differed from the spectra of Examples IV and V and its mass spectrum showed higher alkylation than did the products of Examples IV and V.

*Example VII*

To a 200 ml. single-necked flask equipped with a condenser and mercury bubble-off were added 12.2 grams (0.1 mole) of crystalline decaborane, 1.3 grams (0.01 mole) of finely ground resublimed aluminum chloride and 21.8 grams (0.2 mole) of ethyl bromide. The flask was heated to 38° C., to initiate the reaction and after one hour the reaction was halted by adding 30 ml. of 10 percent by weight hydrochloric acid. 25 ml. of ethyl ether was added and the ether layer was separated. The ether and excess ethyl bromide were removed from this ether layer under reduced pressure and the residue was distilled to separate unreacted decaborane from liquid alkylated decaboranes boiling within the range 80–135° C. at an absolute pressure of 1 mm. of mercury. 10.6 grams of alkylated decaboranes were obtained. Infrared analysis identified mono- and di-ethyldecaborane. The mass spectrophotometer showed traces of decaborane and triethyldecaborane in the product, with the bulk of the product being monoethyldecaborane and diethyldecaborane. The various ethyldecaboranes produced can be isolated from the product by fractional distillation, if desired.

*Example VIII*

To a 200 ml. single-necked flask equipped with a methanol-cooled condenser (below 0° C.) and a mercury bubble-off were added 12.2 grams (0.1 mole) of crystalline decaborane, 1.3 grams (0.01 mole) of finely ground resublimed aluminum chloride and 17 ml. (0.25 mole) of ethyl chloride which had previously been cooled to 0° C. Reaction was allowed to proceed at refluxing temperature (13° C.) for 45 minutes, after which 25 ml. of 5 percent by weight hydrochloric acid was added. 15 ml. of ethyl ether was then added and the ether layer was separated. The ether and excess ethyl chloride were removed by distillation under reduced pressure. The remaining liquid was then distilled to separate decarborane from alkylated products boiling in the range between 80–135° C. at an absolute pressure of 1 mm. of mercury. 15.9 grams of liquid alkylated products was obtained. Infra-red analysis identified higher alkylated decaboranes in addition to monoethyldecaborane and diethyldecaborane. Mass spectrophotometer analysis revealed that the product contained triethyldecaborane, but showed that the bulk of the product was monoethyldecaborane and diethyldecaborane. Only a trace of decaborane was recovered.

*Example IX*

The crystalline decaborane used was obtained by filtering a kerosene-decaborane slurry, washing with petroleum ether, and then drying the decaborane in a vacuum oven. Assay by infrared analysis showed that the decaborane was about 80 percent by weight pure. The aluminum trichloride used (anhydrous and resublimed at −24° C. to 20° C.) was ground in a ball mill before use.

The experiment was conducted in a three-neck, five-liter round-bottom flask, equipped with efficient agitator, a condenser, and a thermometer. Methanol, which was cooled to −50° C. by passing it through a bath of dry ice and trichloroethylene, was circulated through the condenser. A nitrogen source was connected to purge the system during the operation. The reaction flask was immersed in a cooling bath equipped with both cooling and heating coils and a bath stirrer. The vent gas from the reaction, taken from the top of the condenser, was absorbed in two 2-liter suction flasks connected in series and each partly filled with water. The major component of the vent gas was hydrogen halide.

The following experiment is typical of a series of production experiments performed to produce a satisfactory quantity of ethyldecarborane for evaluation:

Eight moles or 978 grams of decaborane were placed in the reaction flask. Then 16 moles or 1760 grams of ethyl bromide were added, and the slurry was chilled to approximately 10° C. The aluminum chloride in the amount of 0.8 mole or 106 grams was then added. The temperature was raised as quickly as possible to the operating range, 22–25° C., 20 minutes being required. The reaction continued for one hour and 40 minutes, or until the suction flasks had increased in weight by a total of 832 grams, corresponding to 10.3 moles of hydrogen bromide (part of this was actually hydrogen chloride originating with the aluminum trichloride). The reaction was "quenched" by adding 400 ml. of water containing 11 grams of HCl. When the addition of water and acid was completed, the water layer was separated from the "organic layer." The latter, amounting to 1702 grams, was then weighed.

The organic layer, amounting to 1702 grams, was dried by the addition of 100 grams of anhydrous magnesium sulfate, mixed intermittently over a period of 3 hours, then filtered under vacuum. The filtrate, containing the dried crude product was heated in a simple one-plate distillation apparatus to remove the excess ethyl bromide. This distillation was continued at atmospheric pressure until the charge reached a temperature of 70° C. At this point no further ethyl bromide was distilling over and the flask and charge were transferred to a column designed to strip decaborane at reduced pressure. This column consisted of a tower of four two-liter bulbs joined by 24/40 standard taper ground glass joints. The charge was heated to 70–75° C. at 1 mm. of mercury absolute pressure for 6 to 8 hours. The unreacted decaborane sublimed up into the tower and appeared as crystals on the inner wall of the bulbs. The decaborane collected in this manner weighed 166 grams (1.4 moles) indicating a conversion of 82.5 percent.

The residue from this stripping operation contained the crude ethyldecaborane reaction product and weighed 966 grams. This material was charged into the pot of a high temperature Podbielniak column. It was distilled at a reflux ratio of 30 to 1 at a pressure of 0.5 mm. of mercury absolute pressure measured at the head. The boiling range was from 46° to 51° C. and a total of 20 cuts were taken, ranging in refractive index from 1.549 to 1.557 (at 20° C.). The bulked weight of the center cut which had a boiling range of 46.0° to 51.0° C. weighed 405 grams; the residue weighed 533 grams.

A second reaction batch weighing 2024 grams was similarly purified except for one step in the recovery of unreacted decaborane. After drying and distillation of the ethyl bromide, the reaction mixture was cooled to room temperature and then chilled to —60° C. in a bath of dry ice and acetone. At this temperature the unreacted decaborane crystallized out of the crude product and was removed by filtration through a Buchner funnel. This step removes a major portion of the unreacted decaborane from the crude product and simplifies the subsequent purification. This batch yielded a total of 186 grams of decaborane or 1.5 moles, indicating a conversion of 81 percent. The first Podbielniak distillation of this batch yielded 314 grams of main cut material distilling at 46 to 52° at 0.5 mm. A total of 13 cuts were taken, ranging in refractive index from 1.545 to 1.556 at 20° C. The bulked weight of this distillae was 314 grams; the pot residue weighed 704 grams.

The distillates from these two distillations were combined to give a total of 719 grams; this was charged into the Podbielniak still and refractionated at a reflux ratio of 120 to 1, at a pressure of 0.5 mm. A total of 26 fractions were obtained over a boiling range of 41° to 51° C.; the range of refractive index was 1.462 to 1.558. Fraction number 18 weighing 16 grams was selected for analysis. It distilled at 50.5–50.7° C. at 0.5 mm. and had a refractive index of 1.5580. The elemental analysis was as follows:

|  | Boron | Carbon | Hydrogen |
|---|---|---|---|
| Found | 71.51 | 15.35 | 12.56 |
|  | 70.74 | 15.77 | 12.64 |
| Calculated for Monoethyldecaborane | 71.96 | 15.97 | 12.07 |

*Example X*

In a long, narrow tube fitted with a condenser and gas dispersion tube was placed 12.2 grams (0.1 mole) of crystalline decaborane and 2.67 grams (0.01 mole) of of aluminum bromide (Fisher, Certified Reagent, Assay 98.5 percent). The tube was heated to 100–110° C. with the use of an oil bath. At this temperature the decaborane had melted and the mixture was dark red in color. The dispersion tube was lowered into the mixture and methyl chloride (The Mathieson Co., Inc.) bubbled through for 45 minutes. After the mixture had been allowed to cool, 30 ml. of concentrated hydrochloric acid was added. This was followed by small amounts of ethyl ether and water. The ethereal layer was separated, washed with water, dilute sodium bicarbonate solution, and again with water. The ether was removed under reduced pressure and the residue distilled through the special distilling head. The yield of liquid boiling at 55–60° C. (1.0 mm.) was 43 percent based on monomethyl-decaborane. No decaborane was recovered. Mass spectrographic analysis indicated the product was a mixture of monomethyl-, dimethyl-, trimethyl-, and some tetramethyl-decaborane.

Various modifications can be made in the procedures of the specific examples to provide other compositions which fall within the scope of our invention. Thus, in place of the methyl iodide, ethyl chloride, n-propyl bromide, isopropyl bromide and ethyl bromide employed as reactants, there can be substituted equivalent amounts of other monohalides having from 1 to 5 carbon atoms, such as methyl chloride, methyl bromide, ethyl iodide, normal propyl chloride, isopropyl iodide, normal butyl chloride, isobutyl bromide, secondary butyl chloride, tertiary butyl iodide, normal amyl chloride, normal amyl bromide and the like. Where the alkyl monohalide employed as a reactant contains more than two carbon atoms, the products produced will have side-chains or alkyl groups which appear to be secondary in configuration, even when normal alkyl monohalides are employed as reactants. This is illustrated by Example IV. Likewise, in place of the aluminum chloride employed as a catalyst, there can be substituted other alkylation catalysts, such as other aluminum halides, for instance, aluminum bromide, or trihalides, particularly chlorides, of group IIIb elements (gallium, indium and thallium), for instance gallium trichloride.

As the specific examples illustrate, the reaction can be performed and the products prepared using a wide variety of reaction conditions. Thus, the examples show that the invention can be practiced with or without a solvent present in the reaction mixture. Where a solvent is employed, the one which is used should be inert under the reaction conditions. Thus, for example, in place of methylcyclohexane there can be employed other saturated hydrocarbons, such as cyclohexane, dimethylcyclopentane, dimethylcyclohexane, decahydronaphthalene, iso-octane, n-heptane and so forth. A solvent can be employed where it is desired to use a higher reaction temperature and to provide a more dilute reaction medium.

As the specific examples illustrate, the relative proportions of decaborane and alkylmonohalide present in the reaction mixture can be varied considerably, without departing from the invention, larger ratios of alkyl monohalide resulting in the production of a higher proportion of dialkylated and trialkylated products. In general, however, the molar ratio of alkyl monohalide to decaborane employed in carrying out the reaction will be within the range from 1 to 6. To limit polyalkylation it may be advantageous in commercial production of alkylated decaboranes to carry out the reaction in the presence of a large excess of decaborane.

The specific examples show in addition that the reaction temperature employed can be varied widely. As would be expected, the use of higher reaction temperatures promotes the reaction rate, and in general, a reaction temperature within the range from about 0° to about 150° C. will be used. Depending upon temperature, alkyl halide and catalyst employed the reaction time may vary from 5 minutes to 72 hours. Most reactions are essentially complete within two hours or less at room temperature.

The compositions of our invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The products of our invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The products of our invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels of the present invention, the local fuel to air ratio in the zone of fuel injection should also be approximately stoichiometric, assuming that the boron, carbon and hydrogen present in the products burn to boric oxide, carbon dioxide and water vapor. In the case of the monoethyldecaborane, for example, this local fuel to air ratio by weight is approximately 0.072. For the higher energy fuels of the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the products of the present invention are employed in essentially the same manner as the simple hydrocarbon fuel presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600–1650° F. Operation at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The products of our invention can also be employed as aircraft gas turbine fuels in admixture with the hydrocarbons presently being used, such as JP-4. When such mixtures are used, the fuel-air ratio in the zone of the combustor where combustion is initiated and the overall fuel-air ratio across the combustor will be proportional to the relative amounts of borohydrocarbon of the present invention and hydrocarbon fuel present in the mixture, and consistent with the air dilution required to maintain the gas temperatures of these mixtures within accepted turbine operating temperatures.

Because of their high chemical reactivity and heating values, the products of our invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme conditions of altitude operations with conventional aircraft fuels.

The burning characteristics of the products of our invention are such that good combustion performance can be attained even at the marginal operating conditions encountered at high altitudes, insuring efficient and stable combustion and improvement in the zone of operation before lean and rich extinction of the combustion process is encountered. Significant improvements in the non-afterburning performance of a gas turbine-afterburner combination is also possible because the high chemical reactivity of the products of our invention eliminates the need of flameholding devices within the combustion zone of the afterburner. When employed in an afterburner, the fuels of our invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The products of our invention will improve the combustion process of the ramjet in much the same manner as that described for the afterburner because of their improved chemical reactivity over that of simple hydrocarbon fuels. When employed in a ramjet the fuels of our invention will be simply substituted for hydrocarbon fuels and used in the established manner.

*Example XI*

Two grams (0.01 mole) of methyl iodide, 1 gram (0.01 mole) of decaborane and 1 gram (0.01 mole) of anhydrous gallium trichloride were added to a 10 cm. test tube. The test tube and contents were heated to about 40° C. and the temperature maintained at this figure for about 15 minutes during which time hydrogen halide was evolved. After allowing the test tube and contents to stand for 90 minutes, about 10 cc. of water was added to decompose the gallium trichloride. The reaction mixture was transferred to a separatory funnel and a small amount of diethyl ether was added to promote the separation of two layers. The water layer was drawn off and discarded; the ether layer, containing the product was distilled at a vacuum of 1 mm. of Hg and about 0.4 cc. of liquid product was recovered. The mass spectrum of this product showed that the distillate contained mono- and di-methyl-decaborane. Pure mono- or di-methyldecaborane can be obtained, if desired, by further fractionation of the liquid distillate.

We claim:

1. A compound selected from the group consisting of monomethyldecaborane and dimethyldecaborane.
2. Dimethyldecaborane.
3. Monomethyldecaborane.
4. A method for the preparation of an alkylated decaborane which comprises reacting decaborane and an alkyl halide selected from the group consisting of alkyl chlorides, alkyl bromides and alkyl iodides having from 1 to 5 carbon atoms while the reactants are in admixture with an alkylation catalyst selected from the group consisting of the trichlorides and tribromides of aluminum, gallium, indium and thallium.
5. A method according to claim 4 in which the alkyl halide is a methyl halide.
6. A method according to claim 4 in which the alkyl halide is methyl iodide.
7. A method according to claim 4 in which the alkyl halide is an ethyl halide.
8. A method according to claim 4 in which the alkyl halide is ethyl chloride.
9. A method according to claim 4 in which the alkyl halide is ethyl bromide.
10. A method according to claim 4 in which the alkyl halide is a propyl halide.
11. A method according to claim 4 in which the alkyl halide is n-propyl bromide.
12. A method according to claim 4 in which the alkyl halide is isopropyl bromide.
13. A method according to claim 4 in which the alkylation catalyst is aluminum chloride.
14. A method according to claim 4 in which the alkyl halide is a methyl halide and in which the alkylation catalyst is aluminum chloride.
15. A method according to claim 4 in which the alkyl halide is an ethyl halide and in which the alkylation catalyst is aluminum chloride.
16. A method according to claim 4 in which the alkyl halide is ethyl chloride and in which the alkylation catalyst is aluminum chloride.
17. A method according to claim 4 in which the alkylation catalyst is aluminum bromide.

No references cited.